UNITED STATES PATENT OFFICE.

ARNOLD S. WAHL, OF WHEATON, ILLINOIS, ASSIGNOR TO THE ARNOLD WAHL INSTITUTE, OF CHICAGO, ILLINOIS, A CORPORATION OF ILLINOIS.

FOOD COMPOUND AND PROCESS OF PREPARING THE SAME.

1,350,756.   Specification of Letters Patent.   Patented Aug. 24, 1920.

No Drawing.   Application filed February 26, 1919. Serial No. 279,314.

*To all whom it may concern:*

Be it known that I, ARNOLD S. WAHL, a citizen of the United States, residing at Wheaton, in the county of Dupage and State of Illinois, have invented a new and useful Improvement in Food Compounds and Processes of Preparing the Same, of which the following is a specification.

My present invention relates to food compounds containing relative large proportions of fermentable sugars together with materials adapted to aid in their fermentation and to processes for the manufacture of such compounds. More specifically, my invention relates to the class of compounds which may be designated as malt syrups, wherein the principal carbohydrate constituent is maltose, which may be conveniently produced by the inversion of starchy carbohydrates resulting from the diastatic action of malt. Syrups of this general character have been described in U. S. Patent No. 1,247,349, dated November 20, 1917, whereof I am a joint inventor.

It is the object of my present invention to produce malt syrups of the character described which shall contain, in addition to the sugars produced by the inversion of starch, the amino bodies and other decomposition or "digestion" products of proteids, together with mineral salts and in my preferred form, lactic acid and the lactic acid derivatives of the salts contained in the compound.

It is a further object of my invention to effect the production of the carbohydrates and proteid decomposition products by the action of enzymes, such as those occurring in malt, and also to cause this action to take place under such conditions as to effect the formation of each of the products under the most favorable conditions, to avoid the formation of intermediate products in the action of the several enzymes utilized and to more perfectly control the proportions and processes of formation of the various types of compounds produced. Further objects of my invention will appear hereinafter.

In carrying out the process of my invention I derive the carbohydrates of the food compound from any suitable starchy material, such as the commercial product known as "mazam," which is a partially gelatinized corn starch in the form of flakes, and is readily soluble without further treatment. Other starchy cereal products may be utilized, it being desirable that a considerable part, at least, of the starch present therein be directly available for the action of diastatic enzymes. The nitrogenous constituents of the compound may suitably be derived from any nitrogen-containing vegetable substance, preferably from wheat bran. The same material likewise forms a desirable source of the mineral constituents of the final product and may also serve as a means for the production of the lactic acid utilized in the course of the present process or for its propagation by the aid of suitable bacteria, *e. g.*, *Bacillus Delbrücki*.

In the practice of my invention I find that the objects thereof may best be accomplished by causing the action of each enzyme or group of enzymes involved to take place upon the selected materials under the conditions most favorable to the action of said enzyme or group of enzymes and independently of other enzymes or materials. In the prior Patent No. 1,247,349, previously referred to, a process is disclosed for the production of a compound resulting from the action of a number of groups of enzymes wherein the enzymes are caused to act in the same mass during successive periods of time by variations in the temperature thereof. Under such conditions I have found that intermediate products of enzyme action may be produced, such as albumens and proteoses by the action of the peptase or other peptonizing or proteolytic enzymes, and dextrins or other incompletely converted starch products by the action of the diastatic enzymes and further that the action of the enzymes active at a lower temperature may weaken those active at a higher temperature and thereby tend to decrease the completeness of their action. The results of these incomplete actions may in many cases be undesirable or deleterious in the intended use of the final compound.

In applying my process to the production of a compound of the general character of that described in the prior patent referred to, I therefore cause each enzymatic conversion to proceed independently under the conditions most conducive to complete action in each case. I also select the initial materials and the ingredients added at the various stages of the process not only in accordance with the result they are to have upon the particular reaction but also in accordance with the constituents which it is desired to secure in the final product.

As illustrative of my invention I shall describe its application to the production of a food compound of the malt syrup type and which shall contain a high proportion of maltose. This compound I produce in such a manner as to contain also amino bodies and other soluble and assimilable nitrogenous compounds, preferably those resulting from the enzymatic decomposition of vegetable proteids. Other constituents which I purpose to have present in the ultimate product in proportions which are to be varied in accordance with the use to which the ultimate product is to be put, are, for example, mineral salts, particularly phosphatic salts, and lactic acid.

Food compounds of this character are suitable for direct consumption by reason of the readily assimilable form in which their constituents are present and also because of the beneficial effects of the mineral salts and lactic acid. They may also be used in the manufacture of other food compounds wherein a carbohydrate fermentation is desired, and particularly in the manufacture of bread. When produced in accordance with my invention such compounds are particularly suitable for the latter purpose. They may contain a large, controlled amount of fermentable maltose, and by my process the presence of undesirable dextrins is very largely avoided and the color of the crust of the bread is correspondingly improved. The nitrogenous constituents may be produced in a soluble and readily assimilable form, chiefly amino bodies, and are hence readily and rapidly utilized by the yeast with a consequent improved development thereof. These compounds also exercise a desirable influence on the color and texture of the crust and crumb similar to that of milk. The minerals present stimulate the development of yeast and in combination with the lactic acid exert a binding action on the gluten of the dough. Lactic acid, which I also cause to be present in controlled amounts aids in rendering the phosphates of the flour soluble, corrects alkalinity and creates better conditions for fermentation. These constituents of the product, all of which aid or influence the process of fermentation, I designate by the term "fermentatives."

The source of the active enzymes which I prefer to utilize is malt, by reason of the readily available form wherein it contains peptonizing and proteolyzing enzymes (peptase) as well as diastase. It is readily apparent, however, that separate materials may be utilized to provide each group of enzymes, or that the enzymes themselves may be utilized in pure or concentrated form; for example, pepsin and diastase may be used.

In selecting the source of the nitrogenous material I prefer to utilize a vegetable material such as a product containing the aleurone layer of plant seeds, and particularly wheat bran, by reason of the character of proteids contained therein and the presence of valuable mineral salts, such as phosphates. I form a mash of the selected material with malt and water in suitable proportions, predetermined in accordance with the composition desired for the ultimate product. This mash which I designate as the peptonization mash, I hold at the temperature most suitable for the effective action of the peptase of the malt, which temperature is approximately 45° C. To modify this mash to improve the conditions of the digestion of the proteids and also to effect a greater solution of the mineral salts, I may add lactic acid in a suitable form, preferably that of a solution or liquor derived from the lactic acid fermentation of a wort containing fermentable carbohydrates and assimilable nitrogenous compounds by the activity of *Bacillus Delbrücki*.

The production of maltose or fermentable sugar from starch I effect by the diastatic inversion of starch. As I have previously stated, the starch subjected to conversion is preferably some product containing it in relatively large amounts and in directly available form. That which I have found most preferable is the flaked corn product variously known on the market as "mazam" and "cerealine," in which product the starch is largely gelatinized and is hence immediately available. To effect the inversion predetermined amounts of the starch product are mashed with a proper proportion of malt and water at the temperature most favorable for the complete conversion of the starch into maltose with a minimum of incomplete conversion products. This temperature should be approximately 60° C., and may reach as high as 65° C.

The proteid and starch conversions being thus separately and independently effected, each may be controlled to secure the best condition for complete conversion and may be predetermined as to ingredients and proportions with the composition of the ultimate product in view.

The two mashes having been completed the products thereof may be combined in several ways, as is readily apparent. For some purposes a desirable product will result by simple admixture of the worts or liquids derived from the two mashes and, if found desirable, a subsequent concentration of the product.

I prefer, however, to combine the conversion products in another manner for the following reasons:

In a proteid conversion mash of the type described above it will be readily apparent that, at the completion of the action of the peptase, the mash will contain the diastase of the malt (much weakened, however) and may also contain more or less starch which will be unconverted at the temperature of this mash. The starch conversion mash will likewise contain more or less unconverted starch, i. e., starch not present in the original starch-containing product in available form. Furthermore, the proteid conversion mash contains more or less lactic acid, which is a valuable adjuvant to diastatic action.

I desire, therefore, in the preferred form of my invention, to utilize also the unconverted starch and the active diastatic enzymes remaining in the several mashes and also to utilize the adjuvant action of the lactic acid. Accordingly I may, after the independent completion of the two mashes under predetermined conditions, mix them in the proper proportions. The temperature of the combined mash is then raised to at least 60° C., this preventing all further action of the peptase. The combined mash may be held at this temperature for a period sufficient to effect as complete a diastatic action on the unconverted starch as is desired. To convert any remaining starch not in available form or ungelatinized, I find it desirable subsequently to raise the temperature of the combined mash to approximately 68° C. or slightly thereabove. At this temperature, any unconverted starch granules are burst, and the entire remaining starch content of the mash constituents is subjected to the diastatic action. By reason of the darkening in color which occurs on long continued holding at this higher temperature I prefer to reduce the duration thereof to as short a period as possible. After completion of the diastatic action in the combined mash, the liquid is drawn therefrom and forms the malt syrup product. It may be utilized in the concentration obtained or may be concentrated, preferably by evaporation *in vacuo*, to any desired content of solids and utilized in the concentrated form.

In the application of my process to the production of a compound having specific proportions and ingredients, I proceed as will be apparent from the following example:

The product desired in this instance is to have a percentage of sugar in the total solids of 81 to 84 (known as the "sugar degree"), and a percentage of total acidity of from 1.70 to 2.25% of total solids, whereof the free acidity is to be low.

The starch conversion mash in this instance will consist of approximately 150 lbs. of corn flakes of the character above described and 75 lbs. of malt of high diastatic power and approximately two barrels of water of 31 gallons each. The mash of these ingredients is held at a temperature of 60° to 62° C. for a period of about one and one-half hours, the diastatic action taking place at this temperature with a maximum conversion to maltose and a minimum production of dextrins.

The peptonization mash corresponding to the above will contain 90 pounds of bran, 45 pounds of malt and approximately 18 pounds of lactic acid liquor to approximately a barrel of water. The lactic acid liquor which I prefer to use is, as hereinbefore stated, of the character of that described in the patent to Robert Wahl, No. 1,028,508, and containing approximately 2% of lactic acid. This mash is maintained at a temperature of 45° C. for a period of approximately one and one-quarter hours. By varying the amount or the acidity of the lactic acid liquor in such a mash the solubility of the mineral salts of the bran may be affected; both total and free acidity may be modified and the character and vigor of the peptase conversion likewise varied.

The periods above stated are those which have been found to produce the most complete conversion of the products involved in each instance. They may, as is apparent, be modified to produce a less complete conversion if the presence of intermediate products is desired. The amounts of water may be varied at the discretion of the operator, it being desirable to avoid too thick a mash.

The two mashes are so made as to be completed simultaneously and at the end of the desired period are combined, brought up quite rapidly to the temperature of the starch conversion (60°–62° C.), and held for a period of approximately one hour. At this temperature the activity of the peptase is destroyed and the diastase alone continues its action. The period of holding may, of course, be varied in accordance with the proportions of available amylaceous material present and the extent of conversion desired. After this conversion, if any starch not available at the temperature at which the previous conversion took place be present, its conversion is effected by heating the combined mash to a temperature of 68° to 70° C. and holding for a period of approximately 30 minutes. The final starch conversion which, as is apparent from the above, may take place in one or two steps, is found to be materially improved by the presence of the lactic acid derived from the proteid conversion products.

The extract from the above will vary in its total solid content in accordance with the amounts of water used, and may reach as high as 20% dry solids. This may be used in this concentration, but in commercial practice I avoid danger of fermentation and increase convenience of handling by concentrating in vacuo further to produce a product having more than 70% solids, and preferably 75 to 76%.

The solids in the extract prepared as above described will contain more than 80% maltose, approximating 85%. The nitrogenous compounds will approximate 11 to 12% (the nitrogen content of the concentrated extract 4 to 6%) and the mineral salts from 2 to 3%. The total acidity of the extract (concentrated) will be from 1.3% to 2% of which from 0.8% to 1.4% will represent free lactic acid and the remainder acid phosphates. These proportions are under the control of the operator during the proteid conversion mash, in which the lactic acid liquor is added.

The product derived from the above is valuable in either its concentrated or unconcentrated form as a food or as a fermentative in cases where a clean, sweet fermentation is desired, such as bread making.

As a food product its content of sugar in the form of maltose, together with the soluble and assimilable nitrogenous conversion bodies, to a great extent in the form of amino-bodies, make it highly desirable. The presence of mineral salts, lactophosphates and acid phosphates and of lactic acid add to its value. In its concentrated form it may be utilized as an exceedingly palatable table syrup.

As a fermentative, for example, in bread making, by reason of the peculiar combination of its ingredients it may be utilized to replace not only the sugar usually added, but also the malt extract or other substances customarily added for the purpose of improving the development of yeast, such as soluble nitrogenous compounds, mineral compounds, etc. Thus 20 pounds of an extract concentrated to about 75% will supply the entire fermentative requirements of a dough for 1,000 loaves, replacing 15 pounds of sugar and 10 pounds of malt extract as usually added to such a dough. The effect of the constituents of the syrup on the resulting baked product has already been stated.

The free acidity of the extract may be readily varied at the will of the operator. It has been found that where the sponge method of making bread is used a lower free acidity is desirable.

The product resulting from my process is substantially free from intermediate conversion products, both of the proteids and of the starch. This results from the perfect control of each conversion possible to the operator. As a consequence of this, the use of the final compound as a fermentative is unaccompanied by objectionable odors or undesirable conditions. However, where it is desired that intermediate conversion products be desired, it is possible by suitable control of the independently effected conversions, to produce in the wort intermediate products of any desired type in predetermined proportions. Thus fermentative worts for the production of beverages, particularly of the low alcohol type, may be readily produced wherein the ultimate nitrogenous compounds are largely albumens and proteoses and the proportion of maltose is relatively low.

It is to be noted that the syrup prepared in accordance with my invention contains the vitamins of the wheat bran, and hence has valuable antineuritic properties, which it imparts to white bread when used in the manufacture thereof.

It is apparent that in the manufacture of malt syrup by my process the character and proportions of the ingredients may be varied at will. Thus, if, in the manufacture of a table syrup a less proportion of nitrogenous compounds is desired relative to the maltose, the proportion of the proteid conversion mash may be decreased relative to the starch conversion mass and the acidity can be increased, if desired, by the addition of a larger proportion of or a more concentrated lactic acid liquor.

Having described in considerable detail the product and process of my invention, with particular reference to a specific form thereof, and without limiting myself to the specific procedure described herein or theories advanced, I claim:—

1. In the process of preparing food compounds containing the decomposition products resulting from a plurality of enzyme conversions, causing each enzyme conversion to take place independently and mixing the resulting conversion products.

2. The process of preparing food compounds by the action of enzymes on vegetable substances which comprises separately converting starchy and proteid substances under controlled conditions and mixing the resulting products.

3. The process of preparing food compounds which comprises separately subjecting starchy material to a diastatic action and vegetable proteid material to a peptonizing and proteolyzing action and admixing the resulting products.

4. The process of preparing food compounds which comprises separately subjecting starchy material to a diastatic action and vegetable proteid containing material to a peptonizing and proteolyzing action under predetermined conditions to avoid the presence of intermediate products, and admixing the resulting products.

5. The process of preparing food compounds which comprises separately subjecting starchy materials to a diastatic action and vegetable proteid containing material to a peptonizing and proteolyzing under predetermined conditions in the presence of bacterial lactic acid and admixing the resulting products.

6. In the process of preparing food compounds containing proteid and starch conversion products, separately subjecting starchy material to the action of the diastase of malt and vegetable proteid containing material to the action of the peptase of malt and admixing the resulting products.

7. The process of preparing food compounds containing proteid and starch conversion products, which consists in subjecting starchy material to the action of the diastase of malt, independently subjecting wheat bran to the action of the peptase of malt and mixing the resulting products.

8. The process of preparing food compounds which consists in forming a mash of starchy material and malt, holding the same under conditions to effect conversion by the action of the diastase of the malt, forming a separate mash comprising a vegetable proteid containing material and malt, holding the same under conditions to effect conversion by the action of the peptase of the malt, and admixing the resulting products.

9. The process of preparing food compounds which consists in forming a mash of starchy material and malt, holding the same under conditions to effect conversion by the action of the diastase of the malt, forming a separate mash containing a vegetable proteid containing material, lactic acid and malt, holding the same under conditions to effect conversion by the action of the peptase of the malt, and mixing the resulting products.

10. The process of preparing food compounds which consists in forming a mash of starchy material and malt, holding the same under conditions to effect conversion by the action of the diastase of the malt, forming a separate mash containing a vegetable proteid containing material and malt, holding the same under conditions to effect conversion by the action of the peptase of the malt, combining the resulting mashes and holding the combined mash under conditions suitable for continued action of the diastase of the malt.

11. The process of preparing food compounds which consists in forming a mash of starchy material and malt, holding the same under conditions to effect a diastatic conversion, forming a separate mash containing a vegetable proteid containing material malt and bacterial lactic acid, holding the same under conditions to effect proteolytic conversion by the peptose of the malt, combining the resulting mashes and holding the combined mash under conditions to effect conversion of unconverted products therein.

12. The process of preparing food compounds which consists in forming a mash of starchy material and malt, holding the same under conditions to effect a diastatic conversion, forming a separate mash containing a vegetable proteid containing material malt and bacterial lactic acid, holding the same under conditions to effect proteolytic conversion by the peptose of the malt, combining the resulting mashes and holding the combined mash under conditions to complete diastatic conversion therein.

13. The process of preparing food compounds which consists in forming a mash of starchy material and malt in predetermined proportions and holding the same under conditions to effect conversion by the action of the diastase of the malt, forming a separate mash containing a wheat bran, lactic acid and malt in predetermined proportions having a desired relation to the proportions of the first mentioned mash, holding the same under conditions to effect peptonization by the action of the peptase of the malt and combining the resulting mashes.

14. The process of preparing food compounds which consists in forming a mash of starchy material and malt and holding the same at a temperature of approximately 60° C., to effect diastatic conversion forming a mash of wheat bran, lactic acid and malt, and holding the same at a temperature of approximately 45° C., to effect proteolic conversion, subsequently combining said mashes, holding the combined mash at a temperature of at least 60° C., and drawing off the extract liquor.

15. The process of preparing food compounds which consists in forming a mash of the proportions of 150 pounds of corn flakes and 75 pounds of malt to two barrels of water and holding the same at a temperature of approximately 60° C. for a period of at least an hour, forming a second mash of the proportions of 90 pounds of bran, 18 pounds of lactic acid liquor and 45 pounds of malt to one barrel of water and holding the same at a temperature of approximately 45° C. for at least an hour, combining the mashes and holding the combined mash at a temperature of at least 60° C., and subsequently drawing off the extract liquor, 16. A liquid food compound containing proteid and starch conversion products and substantially free from intermediate conversion products at least 80% of the solids thereof being maltose.

17. A fermentative food compound consisting of an aqueous extract of proteid and starch conversion products having a total solid content of at least 70%, a total acidity of at least 1.3%, whereof at least 0.8% is free lactic acid, and at least 80% of the solids being maltose.

ARNOLD S. WAHL.